1825B2" /> -->

(12) United States Patent
Lin et al.

(10) Patent No.: US 8,491,825 B2
(45) Date of Patent: Jul. 23, 2013

(54) PROCESS OF MAKING NATURAL TOURMALINE FIBER AND FILTER

(75) Inventors: Ming-Fung Lin, Taichung (TW); Hung-Jen Chen, Taichung Hsien (TW); Chia-Jen Chen, Taichung Hsien (TW); Yung-Chien Chen, Taichung Hsien (TW); Chao-Mulan Chen, Taichung Hsien (TW)

(73) Assignee: Noveko Trading 2008 LLC (HU)

( * ) Notice: Subject to any disclaimer, the term of this patent is extended or adjusted under 35 U.S.C. 154(b) by 850 days.

(21) Appl. No.: 12/693,610

(22) Filed: Jan. 26, 2010

(65) Prior Publication Data

US 2010/0117251 A1 May 13, 2010

Related U.S. Application Data

(62) Division of application No. 11/416,155, filed on May 3, 2006, now Pat. No. 8,231,968.

(51) Int. Cl.
*D01D 5/08* (2006.01)
*D01D 5/088* (2006.01)
*D01D 5/12* (2006.01)
*D01F 1/10* (2006.01)
*D01F 6/04* (2006.01)
*D01F 6/06* (2006.01)
*D03D 23/00* (2006.01)

(52) U.S. Cl.
USPC ............... 264/103; 264/210.2; 264/210.6; 264/210.8; 264/211.14

(58) Field of Classification Search
USPC ............ 264/103, 210.2, 210.6, 210.8, 211.14
See application file for complete search history.

(56) References Cited

U.S. PATENT DOCUMENTS

| 5,981,063 A | 11/1999 | Yokozeki et al. |
| 6,246,159 B1 | 6/2001 | Dejugnac et al. |
| 6,335,856 B1 | 1/2002 | Boisrayon et al. |

*Primary Examiner* — Leo B Tentoni
(74) *Attorney, Agent, or Firm* — Klarquist Sparkman, LLP

(57) ABSTRACT

The present invention provides to a method of producing fiber from tourmaline anion fiber; of which, polypropylene or polyethylene chip, TPE and submicrometer tourmaline particle are prepared and then rolled into submicrometer tourmaline agglomerate through granulation by double screw; then, take submicrometer tourmaline agglomerate and polypropylene or polyethylene chip, of which the content of tourmaline agglomerate accounts for 1~10% of gross weight, and TPE for 1~40% of gross weight; tourmaline agglomerate and polypropylene or polyethylene are melted into composite fiber or filter material via spinning, such that the fiber or filter material can yield anion and present outstanding gas permeability and mechanical property.

12 Claims, 2 Drawing Sheets

PROCESS OF MAKING NATURAL TOURMALINE FIBER AND FILTER

This application is a Divisional of application Ser. No. 11/416,155 filed on May 3, 2006 now U.S. Pat. No. 8,231,968, the entire disclosure of which is herein incorporated by reference.

BACKGROUND OF INVENTION

1. Field of the Invention

The present invention relates generally to a method of producing tourmaline anion fiber and filter material, and more particularly to a method of producing composite fiber from tourmaline, Thermoplastic Elastomer (TPE) and polypropylene or polyethylene, and then forming into filter material, such that the fiber can generate anion, and present outstanding permeability and mechanical property.

2. Description of Related Art

With growing industrialization and social progress, the human beings now meet the challenge of worsening environmental pollution and decreasing anion in atmosphere. And, owing to the transformation of living functions, the people now spend most of time in a limited indoor environment, where air filter is a key factor to ensure good air quality. Today, improving technologically air quality by filter materials without jeopardizing natural environment is one of most cost-effective ways. Therefore, high-tech textiles now become a focus of competition on international textile market, and also contribute much to the growth of textile industry. Anion-based textile products now raise a high priority concern of international textile industry thanks to a wide range of benefits, such as: accelerating blood circulation of human body, improving functional efficiency and physical status, supplementing microelement for the human body, generating far-infrared ray and stimulating recovery function of human cells.

There are three approaches to improve indoor air quality: improve ventilation, minimize indoor pollutants and utilize air cleaner units. For this purpose, differential pressure of filter materials must be lowered with a higher rate of ventilation. Also, filter efficiency shall be improved. An air cleaner unit comprises a cooler, a cleaner and a dehumidifier.

Indoor air filter is generally made of woven filter screen and non-woven filter screen. Woven filter screen can be cleaned and recycled, with lower differential pressure and filtering efficiency. Non-woven filter materials, made of multi-layer stacks, cannot be recycled with higher filtering efficiency and differential pressure. Differential pressure is a decisive factor to ventilation efficiency, rate of air change and horsepower of air conditioning. One purpose of the present invention is to improve filtering efficiency using woven filter screen with lower differential pressure.

Common filters could filtrate powder, but couldn't remove odor. To achieve this goal, anion generator and active carbon filter shall be generally required. Anion generator could generate ozone ($O^3$), which must be less than 0.12 ppm with poor time efficiency, and also limited within 1 m. So, this generator is not suitable for indoor applications. Active carbon filter also has the problem of absorption saturation. Anion tourmaline, a natural mineral, is recognized as a "dust collector of the nature". The second purpose of the present invention is to prepare a permanent deodorant fiber by adding submicrometer tourmaline into polypropylene fiber (environmental-friendly plastic).

Tourmaline is easy to absorb powder due to its thermoelectricity and piezoelectricity. The third purpose of the present invention is to identify if the permanent electric property is able to improve the filtering efficiency.

The fourth purpose of the present invention is to study the filters made of common fiber or other fibers, which neither contain extracted vegetable oil, nor yields volatile oil.

Currently, tourmaline or anion fiber technologies are often used to prepare fiber by combining tourmaline and rayon fiber in water solution, or prepare insoluble fiber by tourmaline and polyvinyl alcohol solution, or by combining titanic, zinc oxide, zirconia, tourmaline, silicon oxide and aluminum oxide. Though tourmaline is contained in these common technologies, these patented fibers are made of different materials with varied methods. However, the efficiency of above-specified technologies shall be further verified due to absence of preferred embodiment.

SUMMARY OF THE INVENTION

The objective of the present invention is to provide a composite filter made of tourmaline, Thermoplastic Elastomer (TPE) and polypropylene or polyethylene, which enables the fiber to generate anion, and present outstanding permeability and mechanical property. Firstly, polypropylene or polyethylene chips, submicrometer tourmaline particles and TPE are mixed and prepared into submicrometer tourmaline agglomerate. Then, take submicrometer tourmaline agglomerate and polypropylene or polyethylene chips (the content of tourmaline agglomerate accounts for 1-10% of gross weight), and melt them into a composite fiber comprising submicrometer tourmaline/polypropylene or polyethylene.

DETAILED DESCRIPTION OF THE INVENTION

A. Fiber of the Present Invention

Figure 1:
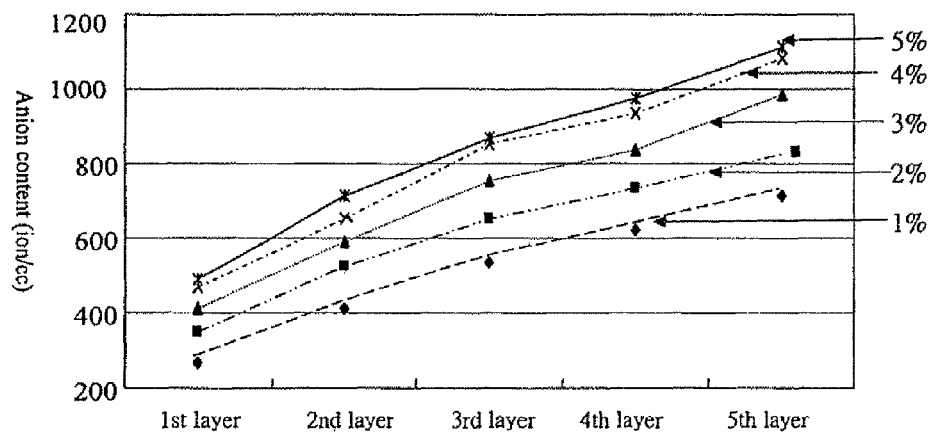
FIG. 1 is the comparison of Anion Release of Tourmaline with Different Contents under the same layer of the present invention.

Tourmaline anion man-made fiber primarily comprises submicrometer tourmaline particle, Thermoplastic Elastomer (TPE) and polypropylene or polyethylene, of which the diameter of fiber is 0.01 mm~3 mm, and particle size of submicrometer tourmaline is 1 micrometer~100 nm, and tourmaline particle accounts for 1~10% of fiber. Tourmaline's far-infrared radiation: 0.94 μm ($3.48*102$ w/m$^2$), particle size distribution: D50(average particle size: 493 nm). Moreover, the present invention permits to produce at least one layer of fluid filter material through aforementioned tourmaline anion man-made fiber. According to one preferred embodiment of the present invention, nano-silver grain can be added into above-specified material to yield immunity to bacteria. Of which, added nano-silver accounts for 0.5~5% of total fiber. According to another preferred embodiment of the present invention, microcapsule may be added into above-specified material. The microcapsule, which contains functional materials such as extracted vegetable oil, accounts for 0.5~5% of total fiber.

The production method of tourmaline anion man-made fiber in the present invention is to prepare a first material, which contains first polypropylene chip accounting for 70%~95% of gross weight with a molecular weight of $3.15 \times 10^5$ g/mole, or first polyethylene chip with a molecular weight of $1.5~2.5 \times 10^5$ g/mole (of which, the preferred embodiments are described in following tests based on first polypropylene accounting for 80% of first material) and submicrometer tourmaline particle accounting for 5%~30% of gross weight, as well as Thermoplastic Elastomer (TPE or EPDM) accounting for 1~40% of gross weight. The first material is rolled into agglomerate through mixing and granulation by double screw, and the second polypropylene chip with a molecular weight of $3.15 \times 10^5$ g/mole, or the second polyethylene chip with a molecular weight of $1.5~2.5 \times 10^5$ g/mole is taken as the second material. Then, mix the agglomerate and the second material. Of which, the content of tourmaline agglomerate accounts for 1~10% of gross weight. Next, the agglomerate and second material are melted into fiber via spinning, cooling, thermal stretching and forming. The temperature of spinning ranges between 200~300° C. (in the preferred embodiment of present invention, the temperature of spinning ranges between 200~250° C. for polypropylene, and between 250~300° C. for polyethylene), extensibility 3~8 times (6 times in the preferred embodiment of the present invention), thermal stretching temperature 130~160° C. (100° C. in the preferred embodiment of the present invention) and thermal forming temperature 70° C.~100° C.

The abovementioned melting and spinning is to heat up and melt polypropylene or polyethylene, and then force out from spinning nozzle into air for cooling and curling at a proper speed. Meanwhile, polypropylene or polyethylene is condensed to form fiber. Next, the fiber is stretched again to improve its mechanical property. The melting and spinning process is to force out spinnable polymer from spinning nozzle at a temperature over melting point, and enable it to be cooled and refined into threadlike material.

B. Fiber Filter Materials of the Present Invention

The production method of fiber filter materials in the present invention is to prepare the first material, which contains first polypropylene chip accounting for 70%~95% of gross weight with a molecular weight of $3.15 \times 10^5$ g/mole, or first polyethylene chip with a molecular weight of $1.5~2.5 \times 10^5$ g/mole (of which, the preferred embodiments are described in following tests based on first polypropylene accounting for 80% of first material) and submicrometer tourmaline particle accounting for 5%~30% of gross weight, as well as Thermoplastic Elastomer (TPE or EPDM) accounting for 1~40% of gross weight. The first material is rolled into agglomerate, and the second polypropylene chip with a molecular weight of $3.15 \times 10^5$ g/mole, or the second polyethylene chip with a molecular weight of $1.5~2.5 \times 10^5$ g/mole is taken as the second material. Of which, the content of tourmaline agglomerate accounts for 1~10% of gross weight. Next, the agglomerate and second material are melted for spinning, cooling, thermal stretching and forming into fiber. The temperature of spinning ranges between 200° C.~300° C. (in the preferred embodiment of present invention, the temperature of spinning ranges between 200~250° C. for polypropylene, and between 250° C.~300° C. for polyethylene), extensibility 3~8 times, thermal stretching temperature 130~160° C. (100° C. in the preferred embodiment of the present invention) and thermal forming temperature 70° C.~100° C. (90° C. in the preferred embodiment of the present invention). Next, submicrometer tourmaline/polypropylene or polyethylene fiber is reeled, and woven into submicrometer tourmaline/polypropylene or polyethylene fiber filter through a weaving machine (a steel shuttle in the present invention), of which the longitudinal density is 35~50 thread/inch, latitudinal density 30~40 thread/inch, and weaving width ☐65.

To guarantee antibacterial immunity, the fiber is mixed with nano-silver grain up to 1% of gross weight of fiber. The following test results show that this invention also presents excellent resistance to bacteria.

Furthermore, in order to validate other effects, the fiber of the preferred embodiment is added with microcapsule accounting for 1% of gross weight. The microcapsule contains functional materials such as extracted vegetable oil, so this invention could yield long-lasting fragrance as demonstrated in the following test.

C. Test of the Present Invention a. The filter materials made of fiber (mainly based on polypropylene) have a stronger mechanical property, with the test results described below:

(1) Tension Strength: Table 1 shows the Test Results of Longitudinal Tension Strength of Submicrometer Tourmaline/Polypropylene Filter Materials(kgf/cm$^2$).

TABLE 1

| Number of Test | No Fabric | Tourmaline Content 1% | Tourmaline Content 2% | Tourmaline Content 3% | Tourmaline Content 4% | Tourmaline Content 5% |
|---|---|---|---|---|---|---|
| 1 | 38.704 | 36.075 | 36.005 | 37.085 | 36.251 | 36.215 |
| 2 | 39.483 | 36.108 | 38.068 | 38.251 | 37.511 | 38.014 |
| 3 | 44.581 | 40.652 | 37.065 | 39.125 | 38.253 | 37.588 |
| 4 | 42.015 | 40.206 | 40.126 | 36.001 | 35.921 | 37.263 |
| 5 | 41.076 | 38.254 | 36.008 | 35.759 | 38.205 | 36.952 |
| Average Value | 41.1718 | 38.259 | 37.4544 | 37.2442 | 37.2282 | 37.2064 |

As shown in Table 1 for composite filter materials containing tourmaline/polypropylene, the tension strength will decline gradually with the increase of longitudinal strength of tourmaline (from 41.17 kgf/cm$^2$ to 37.21 kgf/cm$^2$). This is possibly because that rigid tourmaline powder is embedded into polypropylene fiber structure via melting and spinning, such that the rigidity of anion /polypropylene fiber is improved, but some anion generate particle in the fiber, which may impair the fiber strength. So, tension strength is lowered with growing amount of particle.

(2)Tensile Strength:

Table 2 shows the Influence of Submicrometer Tourmaline Content upon Tensile Strength of Polypropylene Filter Materials (kgf/cm$^2$).

TABLE 2

| Number of Test | No Fabric | Tourmaline Content 1% | Tourmaline Content 2% | Tourmaline Content 3% | Tourmaline Content 4% | Tourmaline Content 5% |
| --- | --- | --- | --- | --- | --- | --- |
| 1 | 21.886 | 23.728 | 22.765 | 21.345 | 22.706 | 22.086 |
| 2 | 23.725 | 19.174 | 21.129 | 22.349 | 20.609 | 20.308 |
| 3 | 26.816 | 24.627 | 21.764 | 22.047 | 21.086 | 21.117 |
| 4 | 21.314 | 18.032 | 21.796 | 19.449 | 21.625 | 20.598 |
| 5 | 22.108 | 24.499 | 22.229 | 23.603 | 21.855 | 21.717 |
| Average Value | 23.1698 | 22.012 | 21.9366 | 21.7586 | 21.5762 | 21.1652 |

As shown in Table 2, submicrometer tourmaline allows a higher rigidity of polypropylene filter materials. In the event of particle interaction, tensile strength differs markedly with or without addition of anion. Therefore, tensile strength of filter materials will reduce with the increase of tourmaline content. In the case of tourmaline content of 1%, longitudinal tensile strength declines about 5%. In the case of tourmaline content of 5%, longitudinal tensile strength declines about 8.6%. According to t-test results, there is not remarkable influence with addition of 1-5% or without addition. Also, the content has no remarkable influence for analysis of variance. So, tensile strength is not affected with addition of tourmaline 1-5%.

(3) Test of Washing Fastness (Test Condition: Indoor humidity is 58%, and temperature 29° C.):

TABLE 4

| Addition of Anion | Prior to Test | Average Value after Five Tests | Decrement of Anion |
| --- | --- | --- | --- |
| 1% | 265 | 263 | 99% |
| 2% | 350 | 343 | 98% |
| 3% | 383 | 365 | 95% |
| 4% | 435 | 416 | 96% |
| 5% | 489 | 461 | 94% |

Table 4 shows the Influence of Submicrometer Tourmaline Content upon Washing Fastness of Polypropylene Filter Materials (Ion/cc). As shown in Table 4, a good fastness is still maintained prior to or after test, so the amount of anion will not reduce due to washing.

(4) Analysis of Filter Efficiency:

Table 5-1 shows the Filter Efficiency of Polypropylene Filter Materials Depending upon Content and Layers of Submicrometer Tourmaline ($\eta$) %.

TABLE 5-1

| Layer of Filter | No Fabric | Tourmaline Content 1% | Tourmaline Content 2% | Tourmaline Content 3% | Tourmaline Content 4% | Tourmaline Content 5% |
| --- | --- | --- | --- | --- | --- | --- |
| 1st layer | 30.120 | 35.875 | 39.012 | 41.543 | 42.687 | 42.987 |
| 2nd layer | 61.000 | 68.174 | 70.705 | 71.849 | 72.149 | 73.123 |
| 3rd layer | 76.000 | 82.569 | 83.713 | 84.013 | 84.987 | 85.125 |
| 4th layer | 86.000 | 90.125 | 90.425 | 91.399 | 91.537 | 91.234 |
| 5th layer | 95.000 | 97.562 | 98.536 | 98.674 | 98.371 | 98.574 |

According to the test results listed in Table 5-1, the filter efficiency of submicrometer tourmaline/polypropylene filter materials with the same layers will be improved with the increase of tourmaline content. This is primarily owing to the fact that anion with slight amount of negative charge can absorb some free powder with positive charge, thus improving filter efficiency of air filter. As shown in Chart 5-1, filter efficiency differs markedly with or without addition of anion (filter efficiency increases by 5.7%-12.8% with addition of 1%-5% tourmaline). But, "deep-layer filtration" effect is a most important influential factor.

(5) Analysis of Anion's Release Efficiency—Static Mode:

Under a static mode, the humidity is 58%, and temperature 28° C. Table 6: shows the Analysis of Anion's Release Efficiency Depending upon Content and Layers of Submicrometer Tourmaline Polypropylene Filter is Materials(Ion/cc).

TABLE 6

| Addition of Tourmaline | 1st Layer Filter Screen | 2nd Layer Filter Screen | 3rd Layer Filter Screen | 4th Layer Filter Screen | 5th Layer Filter Screen |
| --- | --- | --- | --- | --- | --- |
| 1% | 265 | 412 | 532 | 620 | 712 |
| 2% | 350 | 523 | 652 | 734 | 825 |
| 3% | 412 | 589 | 756 | 834 | 985 |
| 4% | 465 | 652 | 852 | 935 | 1080 |
| 5% | 489 | 712 | 867 | 973 | 1115 |

Figure 2:
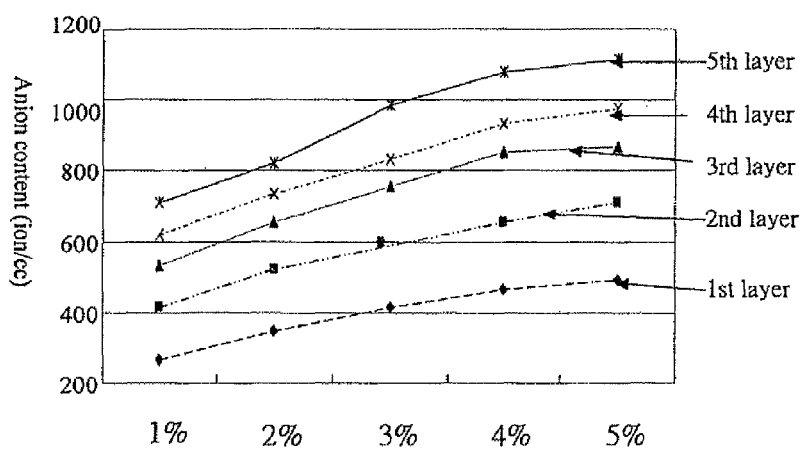
FIG. 2 is the comparison of Anion Release between the filters with different percentage of Content of Tourmaline and Multiple Layers of the present invention.

As shown in FIGS. 1 and 2, addition of both tourmaline and infiltration layers are influential factors, but layers are primary influential factors. Under the same layer but different contents, anion of submicrometer tourmaline polypropylene filter will release up to 265-489 Ion/cc. In the case of content 1%, anion of submicrometer tourmaline polypropylene filter will release up to 265-712 Ion/cc, showing a difference of 223 Ion/cc. In the same volume of tourmaline, more layers will efficiently facilitate the release of anion.

Referring to FIGS. 1 and 2, maximum release content is 1115 Ion/cc, showing a moderate release of anion under a static mode; and the release content is rising slowly. Under a static mode, the curve becomes gentle in the case of tourmaline content 3-5%; addition of anion is not an important release factor in the excess of 3%.

(6) Analysis of Anion's Release Efficiency—Dynamic Mode:

Under a dynamic mode, the humidity is 64%, and temperature 29° C. Table 7 Analysis of Anion's Release Efficiency Depending upon Content and Layers of Submicrometer Tourmaline Polypropylene Filter Materials (%).

TABLE 7

| Addition of Tourmaline | 1st Layer | 2nd Layer | 3rd Layer | 4th Layer | 5th Layer |
| --- | --- | --- | --- | --- | --- |
| 1% | 1025 | 1695 | 2213 | 2732 | 2956 |
| 2% | 1523 | 2573 | 3012 | 3325 | 3456 |
| 3% | 1856 | 3212 | 3512 | 3759 | 3956 |
| 4% | 1956 | 3512 | 3725 | 3856 | 4120 |
| 5% | 1983 | 3603 | 3901 | 3921 | 4220 |

As listed in Table 7, both addition of tourmaline and infiltration layers are influential factors, but layers are primary influential factors.

Figure 3:
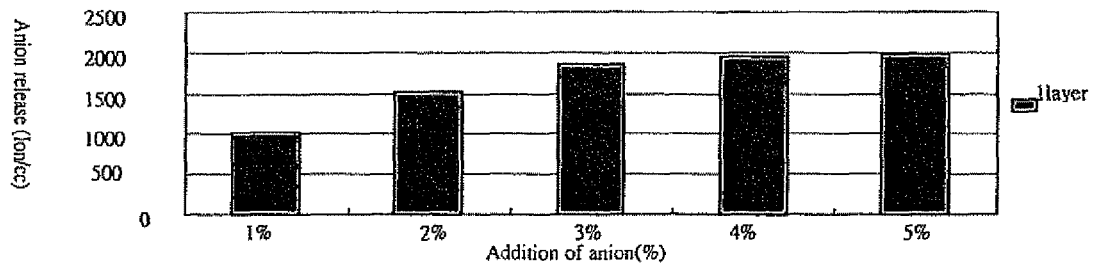
FIG. 3 shows the Analysis of Release Efficiency of Anion with Different Contents under the Same Layer of Submicrometer Tourmaline Polypropylene Filter Material of the present invention.

FIG. 3 shows the Analysis of Release Efficiency of Anion with Different

Contents under the Same Layer of Submicrometer Tourmaline Polypropylene Filter Material. As shown in FIG. 3, under the same layer but different contents, anion of submicrometer tourmaline polypropylene filter material will release up to 1025-1983 Ion/cc; with addition of 3%, anion release will rise towards a fixed value.

Figure 4:
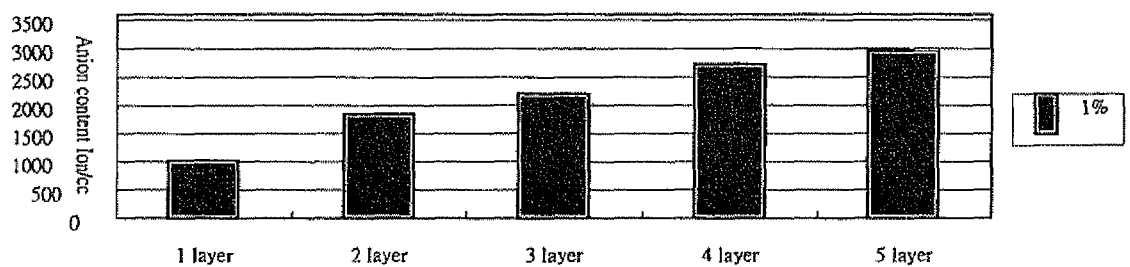
FIG. 4 shows the Analysis of Anion's Release Efficiency with Tourmaline Content less than 1% and under Multiple Layers of Submicrometer Tourmaline Polypropylene Filter Material of the present invention.

FIG. 4 shows the Analysis of Anion's Release Efficiency with Tourmaline Content less than 1% and under Multiple Layers of Submicrometer Tourmaline Polypropylene Filter Material. As shown in FIG. 4, in the case of content 1%, anion of different submicrometer tourmaline polypropylene filter materials will release up to 1025-2956 Ion/cc, and grows with the layers, showing a difference of 973 Ion/cc.

In the same volume of anion-based tourmaline, more layers will efficiently facilitate the release of anion.

Figure 5:
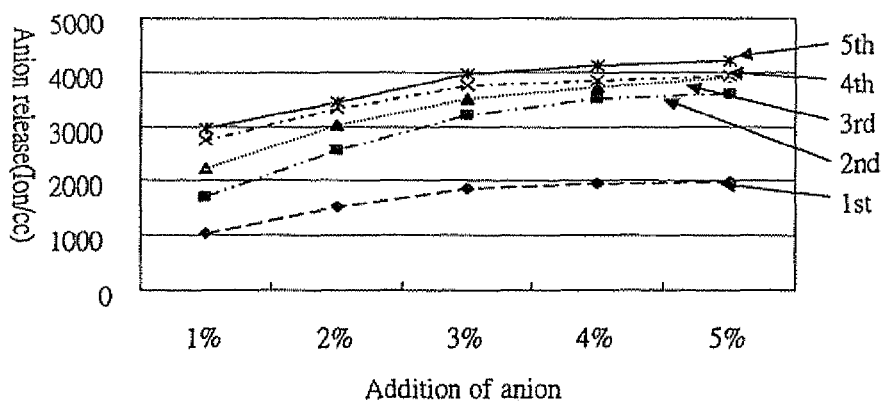
FIG. 5 shows the Analysis of Anion's Release Efficiency Depending upon Content and Layers of Submicrometer Tourmaline Polypropylene Filter Materials.

FIG. 5 shows the Analysis of Anion's Release Efficiency Depending upon Content and Layers of Submicrometer Tourmaline Polypropylene Filter Materials. As shown in the curve of FIG. 5, the curve becomes gentle in the addition of tourmaline 3%-5%. In the excess of 3%, addition of tourmaline is not an important variance factor, as in the case of static mode. As shown in the curve of FIG. 5, the maximum release content is 4220 Ion/cc, showing that anion release in a dynamic mode caters for the needs of human health(1000-2000Ion/CC).

b. The filter materials made of fibers of the present invention have deodorant performance, with the test results described below:

By means of JEM 1467, the filter materials of the present invention are employed to measure the concentration of $NH_3$ and $CH_3CHO$, and then the removing rate for the concentration of $CH_3COOH$. As listed in Table 8, the filter materials of the present invention present outstanding deodorization performance.

Table 8 shows the Deodorization Effect of Filter Materials of the Present Invention as per JEM 1467 Test Method.

TABLE 8

| Item | NH3 | CH3CHO | CH3COOH |
| --- | --- | --- | --- |
| Initial concentration | 24.00 PPM | 8.00 PPM | 0.20 PPM |
| Concentration after 30 minutes | 10.00 PPM | 2.00 PPM | 0.08 PPM |
| Removing rate of multi pollution | 51.25% | 71.25% | 50.00% |
| Total removing rate | 60.9% | | | c. Test Results of Antibacterial Performance of Fiber Filter Materials of the Present Invention:

TABLE 9

| TEST ITEM | 0 Initial Inoculation (CFU/ml) | Contaxt Time (1 hr later) | Redruction(%) (1 hr later) |
| --- | --- | --- | --- |
| Staphy lococcs aures | $1.0 \times 10^5$ | $3.0 \times 10^4$ | 94.8(%) |
| Escherichia coli | $2.1 \times 10^5$ | $1.6 \times 10^3$ | 99.2(%) |
| Klebsiella pneumoniace | $7.3 \times 10^5$ | $3.0 \times 10^4$ | 95.8(%) |

TABLE 9-1

| TEST ITEM | GROWTH-FREE ZONE | CONTACT INHIBITION |
| --- | --- | --- |
| Staphy lococcs aures | 10 mm | 100(%) |
| Escherichia coli | 4.5 mm | 100(%) |
| Klebsiella pneumoniace | 3.5 mm | 100(%) |
| Staphy lococcs aures | 12 mm | 100(%) |
| Escherichia coli | 2 mm | 100(%) |

As listed in Table 9, the filter materials of the present invention present outstanding deodorization performance In ASTM E 2149-01 test. As listed in Table 9-1, the filter materials of the present invention present outstanding deodorization performance In AATCC 147 test.

d. Fragrance Retention Test of Fiber Filter Materials of the Present Invention:

As listed In Table 10, the filter materials of the present invention exhibit a 3-month fragrance retention. The test method is 6-Level Odor Strength Grading method. The values of test result indicate the Perception of the Odor Strength are: 0:Odor less; 1:Odor which can be perceived eventually with effort; 2:Weak Odor which can be identified; 3:Odor which can be perceived easily; 4:Strong Odor; 5:Severe Odor.

TABLE 10

| Test Items | Test Results (initial test) | Test Result (after 3 months test again) |
|---|---|---|
| Odor Faculty Evaluation | 3.4 | 4.0 |

D. Features of the Present Invention

1. According to variance analysis of mechanical strength, addition of tourmaline filter screen will lead to slight change and moderate influence; also moderate influence upon longitudinal and latitudinal tensile strength; no influence upon tensile strength after test of variance, nor on air permeability.
2. In terms of washing fastness; addition of tourmaline is an important factor to washing fastness, but only has a moderate influence level: 94%-99% anion function is still maintained. The life span of polypropylene filter screen is about 3-5 years. The biggest difference with non-woven filter materials lies in: recycling, environmental-friendliness/energy conservation and higher economy in avoiding second pollution.
3. In terms of filter efficiency: tourmaline with negative charge will improve efficiently filter efficiency and absorb particle of 0.01 μm-5μm via the help of "electrostatic adherence principle". As compared to previous inertia collection of 0.5 μm particle, this efficiency is improved significantly. The filter efficiency and dust collection capacity are improved greatly due to "deep filtration". Filtration layer is the most important influential factor of filter efficiency, which may reach 98.5%.
4. Under a static mode: if tourmaline is added to 3%, anion release is slowed, but not exceeds 1000 ion/cc. It can be seen that, tourmaline cannot bring its function into full play in the case of absence of vapor and temperature difference, wind rate fluctuation and frictional effect in a static mode.
6. Under a dynamic mode: both addition of tourmaline and filtration layers are important factors to release, but layers are primary influential factors. When tourmaline is added to 3%, anion release is slowed down. Given the fact of internal vapor and temperature difference of cooler, wind rate fluctuation and frictional effect, as well as thermoelectricity and piezoelectricity of anion for $H_3O_2^-$, anion release in a dynamic mode caters for the needs of human health (1000-2000 ion/cc). A release of 1000-4220 ion/cc is maintained.

Although the invention has been explained in relation to its preferred embodiment, it is to be understood that many other possible modifications and variations can be made without departing from the spirit and scope of the invention as hereinafter claimed.

What is claimed is:

1. A method of producing natural tourmaline anion fiber comprising 70% to 95% by gross weight of a polypropylene having a molecular weight of $3.15 \times 10^5$ g/mole or a polyethylene having a molecular weight of $1.5 \times 10^5$ to $2.5 \times 10^5$ g/mole, 5% to 30% by gross weight of submicrometer tourmaline particles and 1 to 40% by gross weight of thermoplastic elastomer (TPE) or ethylene propylene diene rubber (EPDM), wherein the method comprises the steps of:

mixing and granulating submicrometer tourmaline particles and polypropylene chips or a polyethylene chips via a twin-screw mixer to prepare an agglomerate containing 1 to 10% by gross weight of submicrometer tourmaline particles;

melting and spinning the agglomerate at a temperature of 250° C. to 300° C. to form a spun fiber, and then cooling the spun fiber; and thermal stretching at 100° C. and thermal forming at 90° C., to obtain the natural tourmaline anion fiber.

2. The method as defined in claim 1, wherein the said agglomerate comprises 70% to 95% by gross weight of polyethylene chips with a molecular weight of $1.5 \times 10^5$ to $2.5 \times 10^5$ g/mole and 5% to 30% by gross weight of submicrometer tourmaline particles.

3. The method as defined in claim 1, wherein the said agglomerate comprises 70% to 95% by gross weight of polypropylene chips with a molecular weight of $3.15 \times 10^5$ g/mole and 5% to 30% by gross weight of submicrometer tourmaline particles.

4. The method as defined in claim 1, wherein the said fiber is mixed with 0.5 to 5% by gross weight of nano-silver grains.

5. The method as defined in claim 1, wherein the said fiber is mixed with 0.5 to 5% by gross weight of a microcapsule, wherein the microcapsule contains functional material.

6. The method as defined in claim 5, wherein the said functional material is an extracted vegetable oil.

7. A method of producing filter material, which comprises the steps of:

preparing a first material, which contains 70% to 95% by gross weight of a polypropylene chip having a molecular weight of $3.15 \times 10^5$ g/mole or a polyethylene chip having a molecular weight of $1.5 \times 10^5$ to $2.5 \times 10^5$ g/mole, 5% to 30% by gross weight of submicrometer tourmaline particles and 1 to 40% by gross weight of a thermoplastic elastomer (TPE);

mixing the first material into an agglomerate;

preparing a second material of a polypropylene chip having a molecular weight of $3.15 \times 10^5$ g/mole or a polyethylene chip having a molecular weight of $1.5 \times 10^5$ to $2.5 \times 10^5$ g/mole;

mixing the agglomerate and the second material to form a mixed material, where the content of agglomerate is 1 to 10% by gross weight of the second material;

spinning the mixed material at a temperature of 200° C. to 300° C. and with an extensibility of 3 to 8 times to form a fiber material; and thermal stretching the fiber material at a temperature of 130° C. to 160° C. and thermal forming the same at a temperature of 70° C. to 100° C. to produce a filter material.

8. The method as defined in claim 7, wherein the said first material comprises a first polypropylene, submicrometer tourmaline particles and TPE, and the said second material comprises agglomerate and a second polypropylene.

9. The method as defined in claim 7, wherein the said first material comprises the first polyethylene, submicrometer tourmaline particles and TPE, and the said second material comprises agglomerate and second polyethylene.

10. The method as defined in claim 7, wherein the said fiber is mixed with 0.5 to 5% by gross weight of nano-silver grains.

11. The method as defined in claim 7, wherein the said fiber is mixed with 0.5 to 5% by gross weight of a microcapsule, wherein the microcapsule contains functional material.

12. The method as defined in claim 11, wherein the said functional material is an extracted vegetable oil.

* * * * *